United States Patent
Takatsuka et al.

(10) Patent No.: US 9,840,274 B2
(45) Date of Patent: Dec. 12, 2017

(54) ELECTRIC POWER STEERING CONTROL DEVICE

(71) Applicant: Mitsubishi Electric Corporation, Tokyo (JP)

(72) Inventors: Yuji Takatsuka, Hyogo (JP); Sadaaki Kamei, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/022,269

(22) PCT Filed: Dec. 2, 2013

(86) PCT No.: PCT/JP2013/082363
§ 371 (c)(1),
(2) Date: Mar. 16, 2016

(87) PCT Pub. No.: WO2015/083215
PCT Pub. Date: Jun. 11, 2015

(65) Prior Publication Data
US 2016/0221602 A1    Aug. 4, 2016

(51) Int. Cl.
*B62D 5/04* (2006.01)
*B62D 6/00* (2006.01)
*B62D 6/02* (2006.01)

(52) U.S. Cl.
CPC ............. *B62D 6/02* (2013.01); *B62D 5/0463* (2013.01); *B62D 5/0472* (2013.01)

(58) Field of Classification Search
CPC .... B62D 5/046; B62D 5/0463; B62D 5/0472; B62D 6/00; B62D 6/02; B62D 6/08
See application file for complete search history.

(56) References Cited

U.S. PATENT DOCUMENTS 5,482,129 A * 1/1996 Shimizu ............... B62D 5/0463
                                                      180/446
5,788,010 A * 8/1998 Mukai .................. B62D 5/0463
                                                      180/443
(Continued)

FOREIGN PATENT DOCUMENTS

JP         04071959 A  *  3/1992
JP         08072731 A  *  3/1996
(Continued)

OTHER PUBLICATIONS

JPO machine translation of JP 08-072731 (original JP document published Mar. 19, 1996).*

(Continued)

*Primary Examiner* — Behrang Badii
*Assistant Examiner* — David Testardi
(74) *Attorney, Agent, or Firm* — Sughrue Mion, PLLC; Richard C. Turner

(57) ABSTRACT

An electric power steering control device, in which a control response capability in a low speed region can be improved, and a noise and a vibration can be suppressed, is provided. Although a control amount setter of the electric power steering control device performs a PI control computing in accordance with a deviation between a target current and an actual current, the control amount setter includes a gain setter which varies a gain of a proportion term in accordance with the deviation and a vehicle speed, and a control amount is computed in an integration term by using a predetermined constant gain.

7 Claims, 5 Drawing Sheets

(56) References Cited

U.S. PATENT DOCUMENTS 6,112,846 A * 9/2000 Mukai .................... B62D 5/046
180/443
2001/0002631 A1   6/2001 Okanoue et al.

FOREIGN PATENT DOCUMENTS

| | | | |
|---|---|---|---|
| JP | 11-20499 A | | 1/1999 |
| JP | 11-78919 A | | 3/1999 |
| JP | 2000-108916 A | | 4/2000 |
| JP | 2001001917 A | * | 1/2001 |
| JP | 2001061292 A | * | 3/2001 |
| JP | 3152339 B2 | | 4/2001 |
| JP | 2006-188183 A | | 7/2006 |
| JP | 2009-18808 A | | 1/2009 |
| JP | 2011-63265 A | | 3/2011 |
| JP | 2011-109805 A | | 6/2011 |
| JP | 2011-111080 A | | 6/2011 |
| KR | 1020080110277 A | * | 12/2008 |

OTHER PUBLICATIONS

EPO machine translation of KR 10-2008-0110277 (original KR document published Dec. 18, 2008).*
International Search Report for PCT/JP2013/082363 dated Jan. 14, 2014 [PCT/ISA/210].
Communication dated Sep. 13, 2016, from the Japanese Patent Office in counterpart Japanese application No. 2015-551278.
Communication from Japanese Patent Office, dated Feb. 7, 2017 in corresponding Patent Application No. 2015-551278.
Office Action dated Mar. 9, 2017, issued by the State Intellectual Property Office of People's Republic of China in counterpart Application No. 201380081357.0, 7 pages.

* cited by examiner

ELECTRIC POWER STEERING CONTROL DEVICE

CROSS REFERENCE TO RELATED APPLICATIONS

This application is a National Stage of International Application No. PCT/JP2013/082363, filed on Dec. 2, 2013, the contents of all of which are incorporated herein by reference in their entirety.

BACKGROUND OF THE INVENTION

Technical Field

The present invention relates to an electric power steering control device which assists a steering power transmitted from a driver in a vehicle, and particularly relates to an electric power steering control device in which suppression of a noise and a vibration can be improved while a response capability is maintained in a low speed region.

Background Art

In a conventional electric power steering control device, a target current for driving a motor, which is responded to a handle operation of a driver so as to assist a steering power, is set, and a feedback control method, by which a difference between the target current and an actual motor current is reduced, is adopted. In the control method, a proportion-integration control means (PI control), in which a proportion term (P term) and an integration term (I term) are used in accordance with the difference between the target current and the actual motor current, is generally adopted.

Moreover, it is suggested that a gain of the proportion term (P term) and a gain of the integration term (I term) are varied in a high speed region and a low speed region, and the gain in the high speed region is larger than the gain in the low speed region, whereby a sound and a vibration generated by a steering system are prevented in the low speed region, and a steering response capability of the steering system is improved in the high speed region. In other words, it is suggested that the gain of the proportion term (P term) and the gain of the integration term (I term) are varied in accordance with a vehicle speed, a noise and a vibration, which are easily caused in the low speed region, are suppressed by reducing the gain, and the gain is increased in the high speed region, whereby a response capability is improved (for example, refer to Patent Document 1).

CONVENTIONAL ART DOCUMENT

Patent Document

Patent Document 1: Japanese Patent Publication No. 3152339

SUMMARY OF THE INVENTION

Problems to be Solved by the Invention

However, in a method which is disclosed in Patent Document 1, a gain is decreased in a low speed region, and the gain is increased in a high speed region, so that it is estimated that a response capability in the low speed region is worsened in order to suppress a noise (including an abnormal sound) and a vibration in the low speed region.

In a field of an electric power steering control device, when an element, which is specifically effective in order to reduce the noise, is investigated, it is found that a proportion term (P term) is a main element, and an integration term (I term) does not largely affect a reduction of the noise.

In a general electric power steering control device, a gain of an integration term is originally smaller than a gain of a proportion term, so that even when the small gain is slightly varied, a large effect is not caused at an actual vehicle level. On the other hand, when the gain of the proportion term is more varied, a response capability can be more improved.

An object of the present invention is to provide an electric power steering control device in which a gain of a proportion term (P term) is varied, and a gain of an integration term (I term) is set as a predetermined constant value, whereby a response capability in a low speed region can be maintained, and a noise and a vibration can be suppressed.

Means for Solving Problems

An electric power steering control device includes a torque sensor which detects a steering torque of a handle; a vehicle speed sensor which detects a vehicle speed; a motor which assists a steering power; and a control unit which computes and outputs a control amount, by which the motor is controlled, in accordance with information items of the both sensors, wherein the control unit includes a target current setting means which computes a target current in accordance with the information items of the both sensors, an actual current detecting means which detects an actual current supplied to the motor, a deviation computing means which computes a deviation between the target current and the actual current, and a control amount setting means which computes and outputs the control amount in accordance with the deviation; wherein the control amount setting means includes a PI control computing means which is composed of at least a proportion term and an integration term, and a gain setting means which varies a gain of the proportion term in accordance with the deviation and the vehicle speed, thereby performing a PI control computing in such a way that the proportion term is computed by using the gain, and a gain of the integration term is set as a predetermined constant value.

Effects of the Invention

In an electric power steering control device according to the present invention, a gain of a proportion term (P term) is varied, and a PI control computing is performed in a state where a gain of an integration term (I term) is set as a predetermined constant value, so that a control response capability in a low speed region can be improved, and a noise and a vibration can be suppressed.

MODE FOR CARRYING OUT THE INVENTION

Embodiment 1

Figure 1:
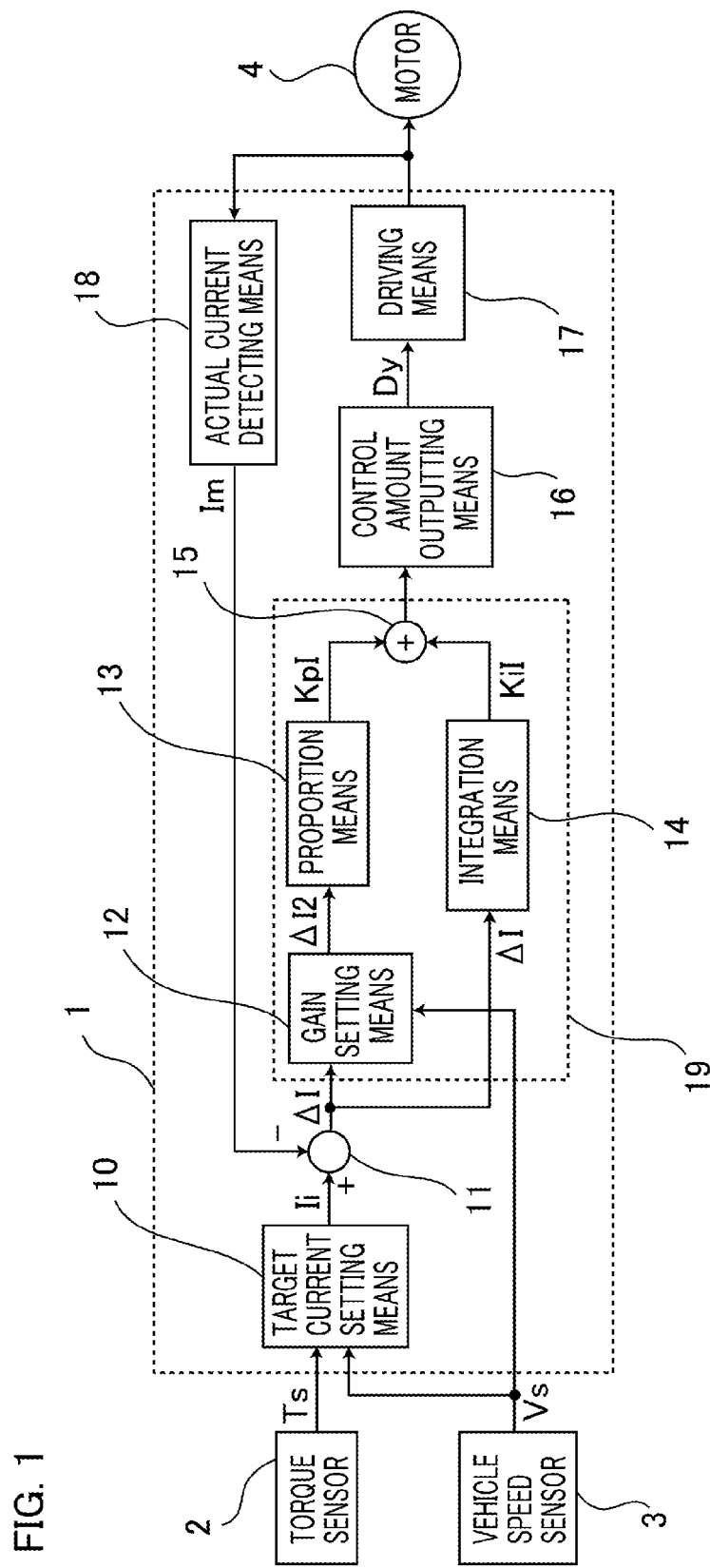
FIG. 1 is an overall schematic diagram illustrating an electric power steering control device according to Embodiment 1 of the present invention.

Hereinafter, an electric power steering control device according to Embodiment 1 of the present invention will be explained in reference to drawings. FIG. 1 is an overall schematic diagram illustrating an electric power steering control device which is installed in a vehicle. The electric power steering control device is composed of a control unit 1 (hereinafter, referred to as ECU 1) for controlling the device, a torque sensor 2 which is mounted near a handle and detects a steering torque, a vehicle speed sensor 3 which detects a vehicle speed, and a motor 4 which assists a steering power of the handle.

The ECU 1, which includes a CPU, is composed of a target current setting means 10 which inputs information items from a steering torque signal (Ts), which is detected by the torque sensor 2, and a vehicle speed signal (Vs), which is detected by the vehicle speed sensor 3, and sets a target current (Ii), an actual current detecting means 18 which measures an actual current (Im) which is supplied to the motor 4, a deviation computing means 11 which computes a deviation (ΔI) between the target current (Ii) and the actual current (Im), a control amount setting means 19 which performs a PI control computing in accordance with the deviation (ΔI) and outputs the computing signal, a driving means 17 which is composed of a bridge circuit having a switching element and drives the motor 4, and a control amount outputting means 16 which converts an output of the control amount setting means 19 into an control amount (Dy) for the switching element of the driving means 17.

Moreover, the control amount setting means 19 is composed of a proportion means 13 which computes a proportion term and outputs a proportion signal (KpI), an integration means 14 which computes an integration term and outputs an integration signal (KiI), an addition means 15 which adds and computes both computing results, and a gain setting means 12 which is inserted between the deviation computing means 11 and the proportion means 13 and inputs the vehicle speed signal (Vs) which is detected by the vehicle speed sensor 3.

In other words, the gain setting means 12, which varies a gain of the proportion term in accordance with the deviation (ΔI) of the currents and the vehicle speed signal (Vs), is inserted only to the proportion means 13, and the gain setting means 12 is not inserted to the integration term. Therefore, a gain of the integration term is computed in accordance with a predetermined constant gain which is not varied by the vehicle speed and the deviation. On the other hand, the proportion term is computed by using a gain (ΔI2) which is varied and set.

Hereinafter, the gain setting method will be specifically explained by using FIG. 2.

Figure 2:
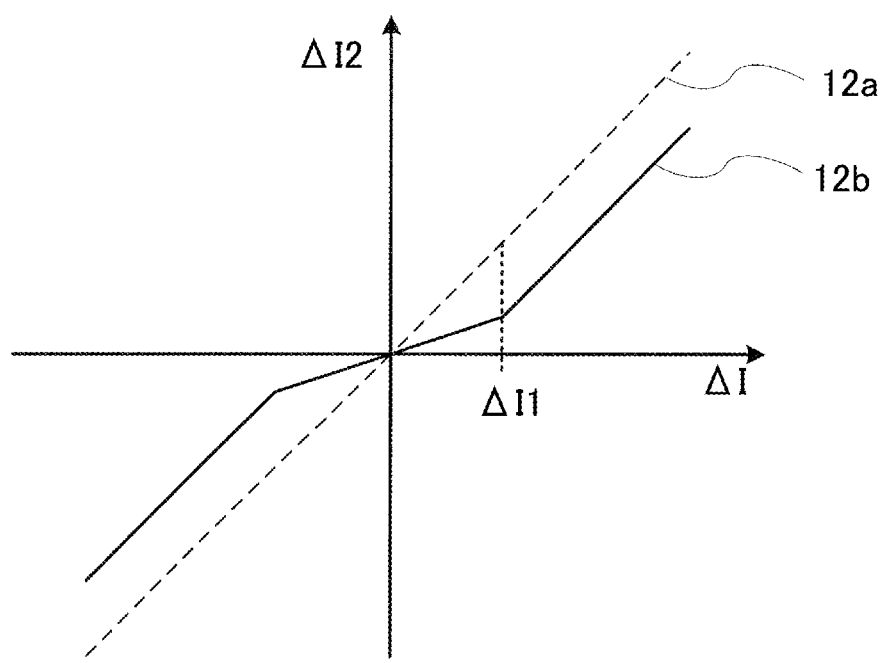
FIG. 2 is a specific characteristic chart of a gain setting according to Embodiment 1 of the present invention.

FIG. 2 indicates a specific gain setting example according to Embodiment 1, and a characteristic I2a (dotted line) is a "gain=α" characteristic, and a characteristic I2b (solid line) is a "gain<α" characteristic in a region where the deviation ΔI is small (smaller than or equal to ΔI1), and the characteristic I2b is a "gain=α" characteristic in a region where the deviation ΔI is large (larger than ΔI1).

It is suitable that the characteristic I2a (dotted line) is selected when a vehicle speed is higher than or equal to a predetermined value, for example, 20 km/h, and the characteristic I2b (solid line) is selected when the vehicle speed is lower than the predetermined value, for example, 20 km/h.

As described above, the electric power steering control device according to Embodiment 1 of the present invention is controlled in such a way that the gain of the proportion term is varied in accordance with the vehicle speed and the deviation, and the integration term is set as a predetermined constant value. Moreover, at least a vehicle speed region is separated into a low speed region and a high speed region, and different gains are set in each of the regions, and the gains are set in such a way that the gain in the high speed region is larger than the gain in the low speed region. The gain indicates a tendency in which the gain is increased when the deviation is increased, and the gain in the low speed region, in which the deviation is small, is the smallest in all gains.

It is one reason, in which suppression of a noise and a vibration is slightly affected even when the gain of the integration term is fixed, that the gain of the integration term is originally small in comparison with the gain of the proportion term. Therefore, even when the small gain is slightly varied, a large effect is not caused at an actual vehicle level. On the other hand, the proportion term is corresponding to the deviation, and a control amount, which is originally computed, is different from a value of the integration term, and when the gain is more varied, a response capability can be more improved.

However, when the gain is excessively increased, a convergence capability is worsened, and a suppression effect of the noise and the vibration is reduced. Therefore, the gain is varied in accordance with the deviation. Thereby, the control is effectively performed in a region where the deviation is relatively small, and a possibility of causing the noise and the vibration is reduced when the gain is increased, so that the gain is set as a suppressed value. On the other hand, the gain is different from an assistance requirement of a driver in a region where the deviation is large, so that it is required that the response capability is improved, in other words, the gain is increased, and the gain is early closed to a target control amount. As described above, the gain of the proportion term is varied in accordance with the vehicle speed and the deviation, whereby the noise, the vibration, and the response capability can be concurrently maintained.

Embodiment 2

Figure 3:
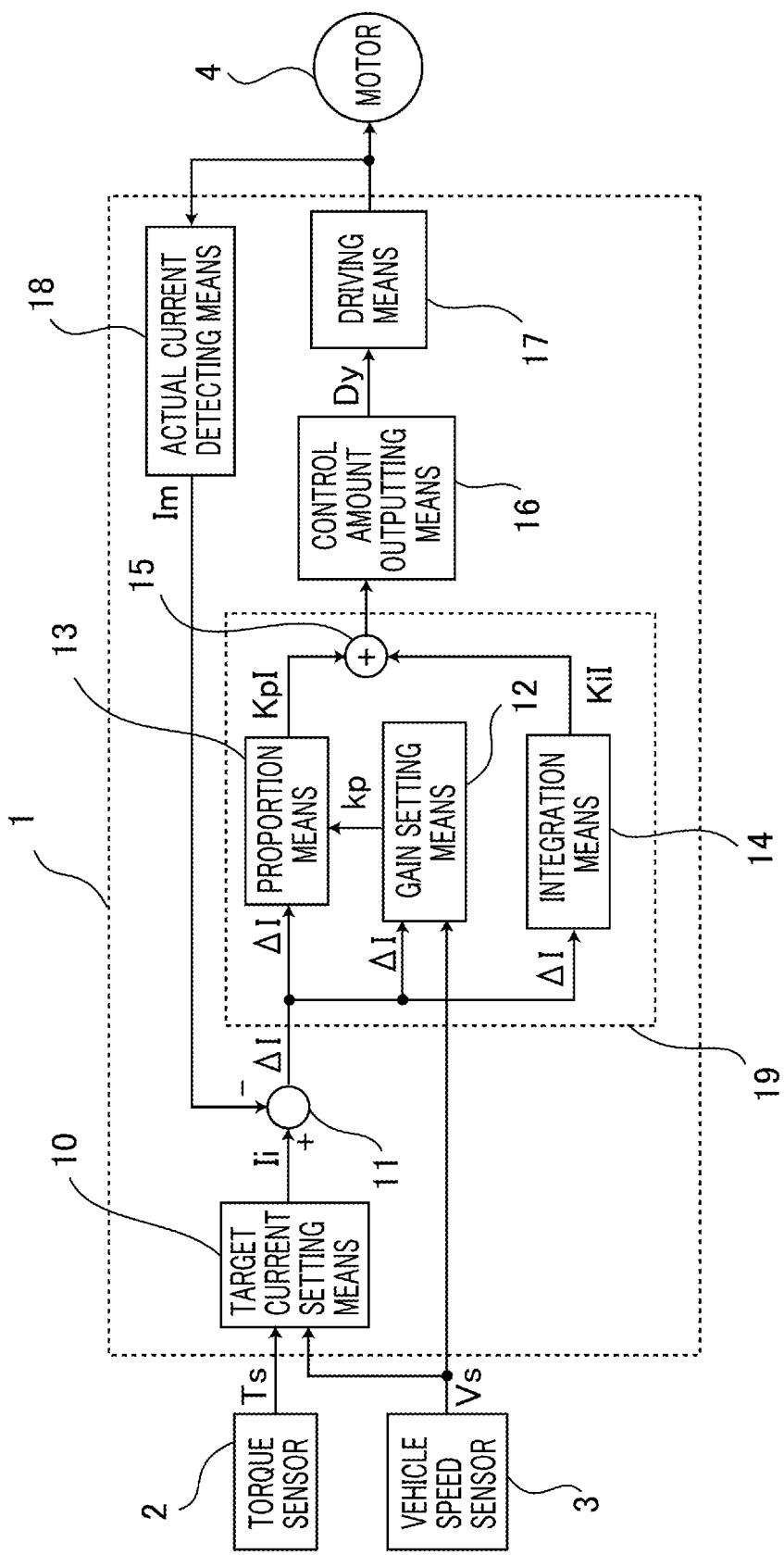
FIG. 3 is an overall schematic diagram illustrating an electric power steering control device according to Embodiment 2 of the present invention.

Hereinafter, an electric power steering control device according to Embodiment 2 of the present invention will be explained by using FIG. 3 and FIGS. 4A, 4AB and 4C. A position of a gain setting means 12 is varied in comparison with FIG. 1. In particular, although the gain setting means 12 is inserted between the deviation computing means 11 and the proportion means 13 in the electric power steering control device according to Embodiment 1, the gain setting means 12 is inserted in parallel with a proportion means 13 and an integration means 14 in the electric power steering control device according to Embodiment 2. The gain setting means 12 calculates a gain (Kp) of a proportion term in accordance with a deviation (ΔI) and a vehicle speed (Vs), and the proportion means 13 calculates a KpI by multiplying the deviation (ΔI) by the gain Kp.

Figure 4A:
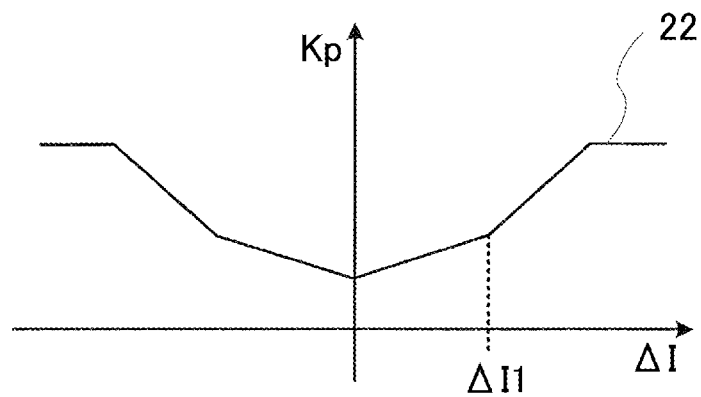
FIGS. 4A, 4B and 4C are specific characteristic charts of a gain setting according to Embodiment 3 of the present invention.

FIG. 4A is a characteristic chart illustrating a specific content of the gain setting means 12 in a low speed region.

The low speed region represents a region in which, for example, a vehicle speed is lower than 20 Km/h. A lateral axis represents the deviation (ΔI) between a target current and an actual current, and a vertical axis represents the gain (Kp) of the proportion term. In a region where the deviation (ΔI) is relatively small, in other words, in a region where the actual current is closed to the target current (|ΔI|<ΔI1), the gain is relatively small, and when the deviation is more increased, a characteristic (22), in which the gain is increased, is indicated.

Figure 4B:
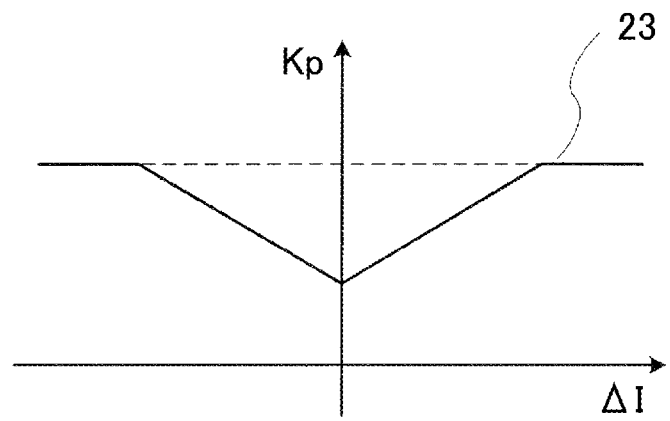

On the other hand, FIG. 4B is a characteristic chart in a high speed region, and FIG. 4B indicates a characteristic (23) in which the gain (Kp) is proportionally increased in accordance with the deviation (ΔI). As described above, the gain (Kp) of the proportion term is varied in accordance with the vehicle speed and the deviation. On the other hand, a gain of an integration term is set as a constant value, whereby a control operation, in which a response capability is important and a steering feeling is improved, can be performed. In addition, when the deviation exceeds a predetermined value as illustrated in FIGS. 4A, 4B and 4C, the gain is fixed at a maximum value, so that it is considered even in the high speed region that the gain is not more increased and the convergence capability of the control operation is not worsened.

Figure 4C:
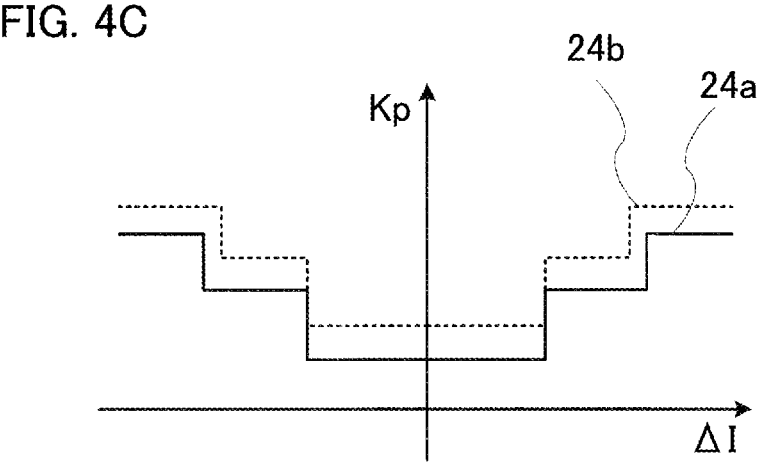

Moreover, FIG. 4C indicates a characteristic (24) in which the gain (Kp) of the proportion term is not continuously varied in accordance with the deviation (ΔI), and the gain (Kp) is varied at many steps. In FIG. 4C, a symbol "24a" indicates a characteristic in a low speed region, and a symbol "24b" indicates a characteristic in a high speed region. As illustrated in FIG. 4C, even when multiple constant gains are set with respect to the deviation, an equivalent effect is realized.

Embodiment 3

Figure 5:
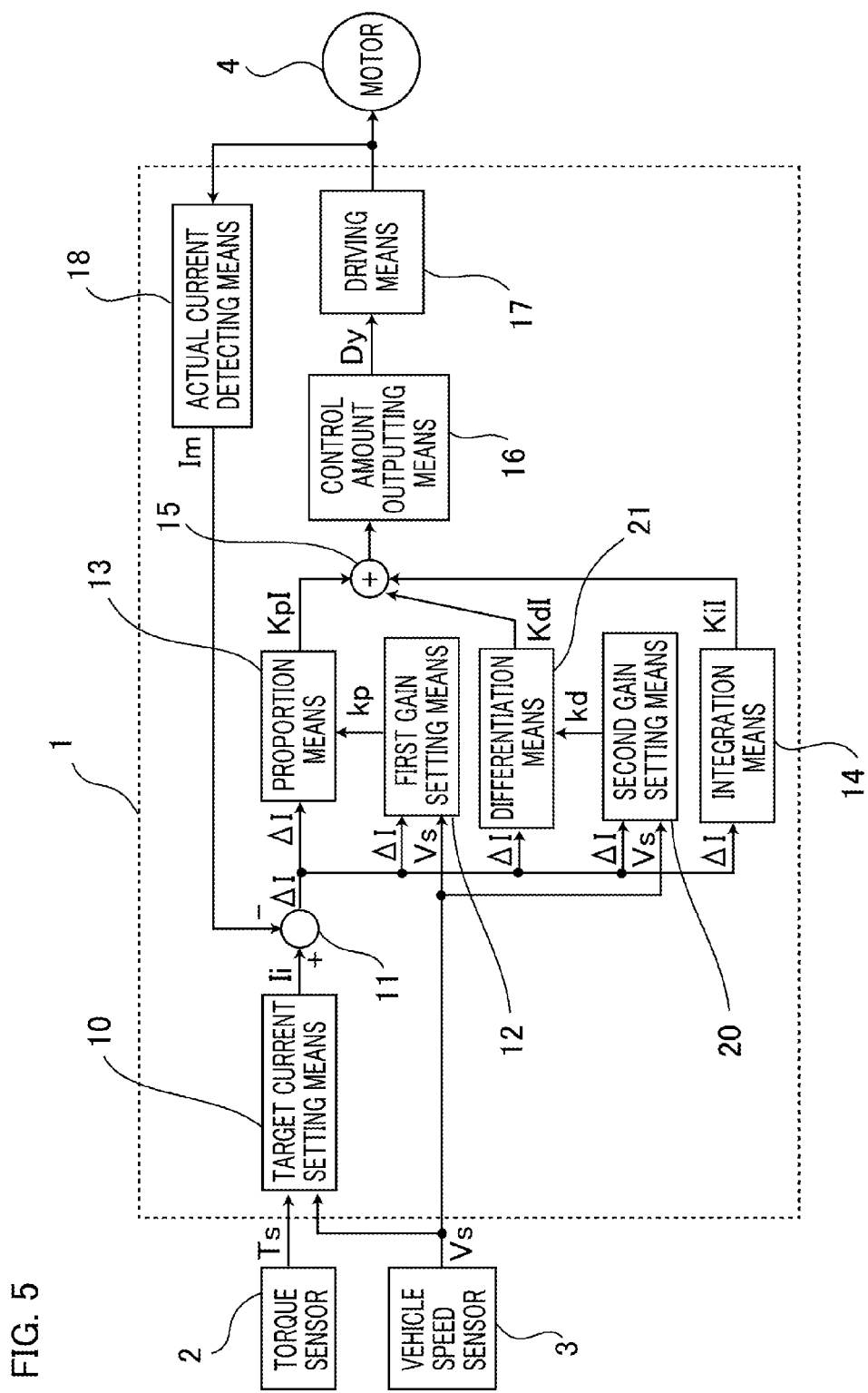
FIG. 5 is an overall schematic diagram illustrating an electric power steering control device according to Embodiment 3 of the present invention.

Hereinafter, an electric power steering control device according to Embodiment 3 of the present invention will be explained by using FIG. 5. A differentiation term is added in comparison with the electric power steering control device according to Embodiment 1 and Embodiment 2. In particular, a differentiation means 21 is added in parallel with a proportion means 13 and an integration means 14, and a first gain setting means 12 and a second gain setting means 20 are provided instead of the gain setting means 12 according to Embodiment 1 and Embodiment 2. The differentiation means 21, which computes the differentiation term, is added in order to compute a control amount. The first gain setting means 12 and the second gain setting means 20 calculate a gain (kp) of a proportion term and a gain (kd) of the differentiation term in accordance with a deviation (ΔI) and a vehicle speed (Vs), and the proportion means 13 calculates a KpI by multiplying the deviation ΔI by the gain kp of the proportion term, and the differentiation means 21 calculates a KdI by multiplying the deviation ΔI by the gain kd of the differentiation term.

In a similar method according to Embodiment 2, it can be selected in a specific gain setting method that the gain is linearly varied in accordance with the deviation, or the gain is varied at many steps. The gain of the proportion term and the gain of the differentiation term can be varied by this method. Therefore, not only when the deviation is large but also when the deviation is small, a tendency, in which the deviation is increased in the future, is detected, and a quick response can be performed, and a response capability can be more improved.

DESCRIPTION OF THE SYMBOLS

"1" is a control unit; "2," a torque sensor; "3," a vehicle speed sensor; "4," a motor; "10," a target current setting means; "11," a deviation computing means; "12 and 20," gain setting means; "13," a proportion means; "14," an integration means; "15," an addition means; "16," a control amount outputting means; "17," a driving means; "18," an actual current detecting means; "19," a control amount setting means.

What is claimed is:

1. An electric power steering control device including:
   a torque sensor which detects a steering torque of a handle;
   a vehicle speed sensor which detects a vehicle speed;
   a motor which assists a steering power; and
   a control unit which computes and outputs a control amount, by which the motor is controlled, based on information provided by the torque sensor and the vehicle speed sensor;
   wherein the control unit includes a target current setter which computes a target current based on the information provided by the torque sensor and the vehicle speed sensor, an actual current detector which detects an actual current supplied to the motor, a deviation computing unit which computes a deviation between the target current and the actual current, and a control amount setter which computes and outputs the control amount in accordance with the deviation;
   wherein the control amount setter comprises:
   a PI control computing unit which is composed of at least a proportion unit which calculates a proportion term and an integration unit which sets an integration term, and
   a gain setter which varies a gain of the proportion term in accordance with the deviation and the vehicle speed, thereby performing a PI control computing in such a way that the proportion term is calculated by using the gain for the proportion term, as set by the gain setter, and a gain of the integration term is set as a predetermined constant value,
   wherein the gain setter separates a vehicle speed region into a low speed region and a high speed region, and sets the gain of the proportion term in the high speed region to be larger than the gain of the proportion term in the low speed region, while the gain of the integration term remains the predetermined constant value in the low speed region and the high speed region, and
   wherein the gain setter proportionally increases the gain for the proportion term in the high speed region as the deviation increases.

2. An electric power steering control device according to claim 1, wherein the gain setter sets the gain of the proportion term so that the gain of the proportion term is increased when the deviation is increased.

3. An electric power steering control device according to claim 2, wherein the gain of the proportion term in the low speed region, in which the deviation is small, is set to be relatively small.

4. An electric power steering control device according to claim 1, wherein the gain setter sets the gain of the proportion term at many steps in accordance with the deviation and the vehicle speed.

5. An electric power steering control device according to claim 1, wherein the gain setter is inserted between the deviation computing unit and the proportion unit, and a deviation signal (ΔI), which is outputted from the deviation computing unit, and a vehicle speed signal (Vs), which is outputted from the vehicle speed sensor, are inputted to the gain setter.

6. An electric power steering control device according to claim 1, wherein the deviation computing unit provides parallel inputs of a deviation signal (ΔI) to the gain setter, the proportion unit, and the integration unit, and a vehicle speed signal (Vs), which is outputted from the vehicle speed sensor, is inputted to the gain setter.

7. An electric power steering control device according to claim 1, wherein the control amount setter includes a differentiation term in the PI control computing unit, and the gain setter can set each of the gains of the proportion term and the differentiation term except for the integration term in accordance with the deviation and the vehicle speed.

* * * * *